Feb. 24, 1931.  LA DON BARBER  1,793,730
COMBINED TAIL AND STOP LIGHT
Filed Aug. 28, 1929
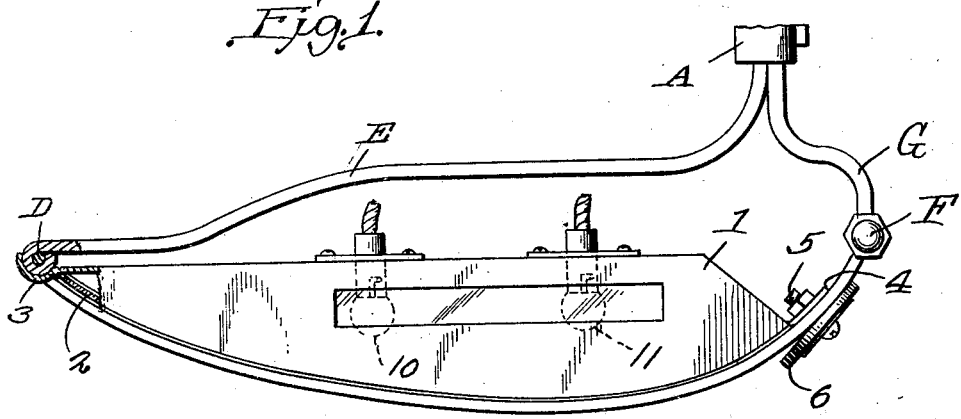
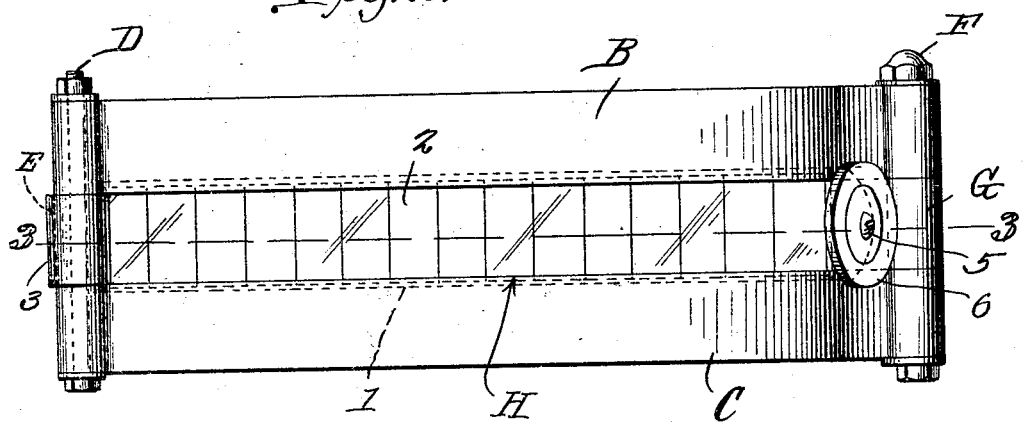
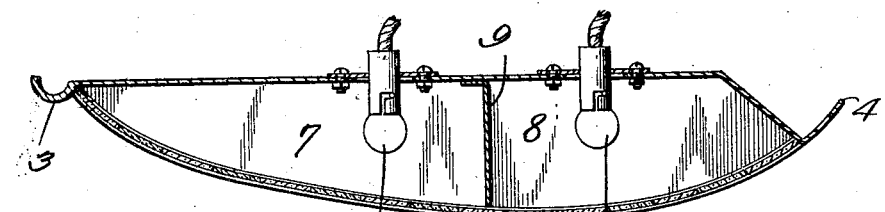
LaDon Barber.
Inventor
By CA Snow & Co.
Attorneys Patented Feb. 24, 1931

1,793,730

UNITED STATES PATENT OFFICE

LA DON BARBER, OF LANSING, MICHIGAN

COMBINED TAIL AND STOP LIGHT

Application filed August 28, 1929. Serial No. 389,000.

This invention relates to a combined tail and stop light designed primarily for use on a rear bumper of an automobile, one of the objects being to provide a structure of this character which can be combined readily with a bumper, the space provided between the upper and lower springs of the bumper constituting a window through which the light rays are permitted to escape from the housing of the structure.

Another object is to provide a device of this character which can be assembled readily with a bumper and held securely thereto.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred form of the invention has been shown.

In said drawing,

Figure 1 is a plan view of a bumper showing the housing of the combined tail and stop light attached thereto.

Figure 2 is a rear elevation of the structure shown in Figure 1.

Figure 3 is a section through the lamp housing, said section being taken on the line 3—3, Figure 2.

Referring to the figures by characters of reference, A designates a bumper of the type including spaced upper and lower springs indicated at B and C, these springs being connected at one end by a bolt D to the end of the rear spring E of the bumper. Another bolt F connects the other ends of the springs B and C to the end of a spring G.

The housing of the structure constituting the present invention has been indicated at 1 and is closed at the top, bottom, back and one end. This housing is of such height as to bridge the space H formed between springs B and C and lap the upper and lower walls of said space as indicated by dotted lines in Figure 2. That face of the housing nearest the springs B and C is shaped to conform to the inner contour of said spring and is closed by means of panels 2 formed of glass or other translucent material, it being designed to have these panels of different colors. The series of panels extend throughout the length of the open face of housing 1. At one end of the housing 1 there is provided a curved tongue 3. This is adapted to be inserted into the space H so as to straddle the front portion of the bolt-engaging end of spring E as shown, for example, in Figure 1. From the other end of the housing is extended a tongue 4 and this is adapted to be engaged by a bolt 5 extending from a cap 6 which bridges the space H as shown.

The interior of the housing is divided into two compartments indicated at 7 and 8 by a partition 9 and a lamp 10 is located in compartment 7 while another lamp 11 is located in compartment 8. Circuits to these lamps are adapted to be closed by any suitable means provided for that purpose, one of the lamps being used as a stop light while the other is to be used as a tail light.

Obviously when either or both of the lamps are lighted the rays therefrom will be directed through the transparent or translucent panels 2 which will be illuminated between springs B and C where they can be seen readily.

In applying this lamp to a bumper the curved tongue 3 is first inserted between the springs B and C and positioned to straddle the end portion of spring E as already explained. Tongue 4 is then pressed against the inner faces of the springs B and C after which it is clamped thereto by means of the bolts 5. Thus the housing will be held securely in place.

What is claimed is:

1. The combination with a bumper including superposed spaced springs providing an opening therebetween and means connecting the springs, of a lamp housing having one face adapted to fit snugly against the springs, there being an open face in the housing exposed through the opening between the springs, means at one end of the housing for insertion between the springs and into engagement with one of the connecting means, and means at the other end of the housing for binding said housing against the springs.

2. The combination with a bumper including superposed spaced springs and a connection between the springs at one end, of a lamp housing removably mounted within the bumper, said housing being adapted to direct light rays through the space between the springs, a lamp in the housing, a tongue extending from one end of the housing and insertable between the springs, said tongue removably straddling the connecting means, and means for binding the housing against the springs.

3. A device of the class described including a housing adapted to be removably mounted on a bumper and to fit snugly against the back face thereof, said housing having an open face for directing light rays through an opening in the bumper, translucent panels extending across the open face of the housing, and means at each end of the housing for detachably securing it to a bumper.

4. A device of the class described including a housing adapted to be removably mounted on and to fit snugly against the back face of a bumper and to bridge an opening in the bumper, translucent panels forming that face of the housing adapted to be exposed through the opening, means at one end of the housing for engagement with the bumper at one end of the opening therein, and means at the other end of the housing for attaching said housing to the bumper.

In testimony that I claim the foreging as my own, I have hereto affixed my signature.

LA DON BARBER.